United States Patent [19]

McDaniel

[11] Patent Number: 4,783,024
[45] Date of Patent: Nov. 8, 1988

[54] SPEEDBRAKE

[75] Inventor: Michael A. McDaniel, Bend, Oreg.

[73] Assignee: Precise Flight, Inc., Bend, Oreg.

[21] Appl. No.: 930,919

[22] Filed: Nov. 17, 1986

[51] Int. Cl.$^4$ ............................................... B64C 9/36
[52] U.S. Cl. ..................................... 244/113; 244/213
[58] Field of Search ........... 244/213, 214, 215, 110 B, 244/113, 110 D, 90 A, 201

[56] References Cited

U.S. PATENT DOCUMENTS

| 2,723,091 | 11/1955 | Davies et al. | 244/113 |
| 2,768,801 | 10/1956 | Bitner et al. | 244/213 |
| 2,821,352 | 1/1958 | Phillips | 244/90 A |
| 3,318,555 | 5/1967 | Swogger et al. | 244/201 |

FOREIGN PATENT DOCUMENTS

| 436096 | 10/1926 | Fed. Rep. of Germany | 244/113 |
| 985567 | 3/1965 | Fed. Rep. of Germany | 244/213 |
| 222435 | 10/1942 | Switzerland | 244/113 |

OTHER PUBLICATIONS

Dolan, "Get Down to Speed and Altitude-Fast" *Private Pilot*, May 1987, pp. 32-37.

*Primary Examiner*—Galen Barefoot
*Attorney, Agent, or Firm*—Chernoff, Vilhauer, McClung & Stenzel

[57] ABSTRACT

The speedbrake of the present invention is comprised of a housing which can be stored in a faired surface of an aircraft which is not within the aerodynamic envelope of its wing. The housing is associated with a track system which permits it to be translated between a retracted position, where it is located inside of the faired surface, and an extended position, where it protrudes into the airstream to create drag when the aircraft is in flight. Pivotally mounted in the housing are plates which rotate up into the housing when the speedbrake is retracted and extend downwardly from the housing when the speedbrake is extended. The speedbrake is installed in pairs with one being located on each side of the aircraft. One of the speedbrakes is moved between its extended and retracted positions by a motor and the other speedbrake is connected to the motor-powered one by cables. Since the speedbrakes are not located on or near the wing they do not influence the pitch or control of the aircraft when they extend or retract. Thus, the speedbrakes can be deployed at any time regardless of the speed and altitude of the aircraft.

8 Claims, 2 Drawing Sheets

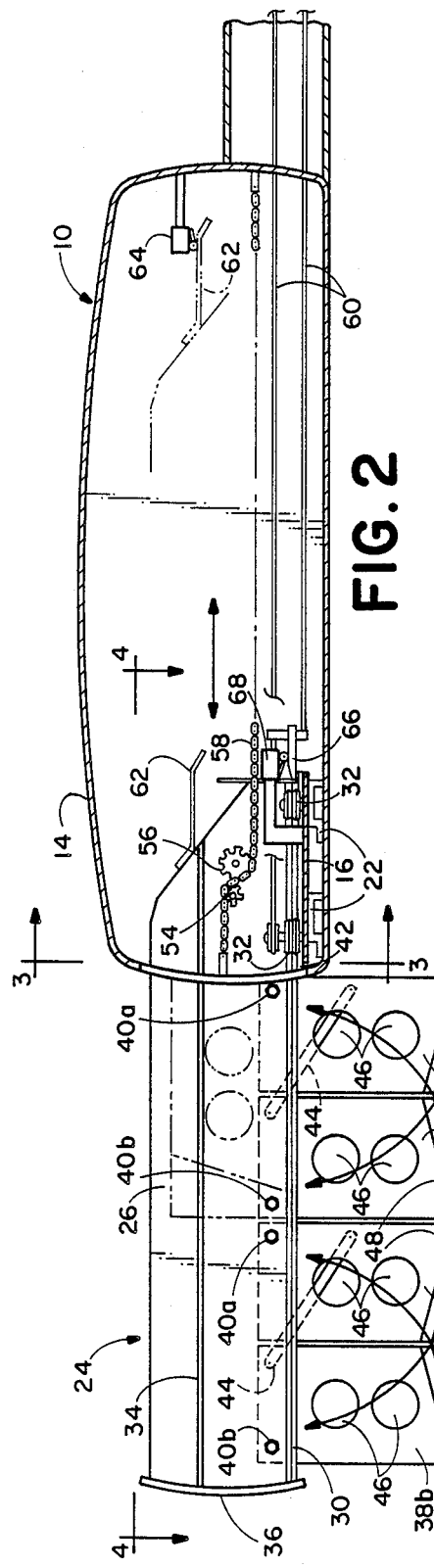
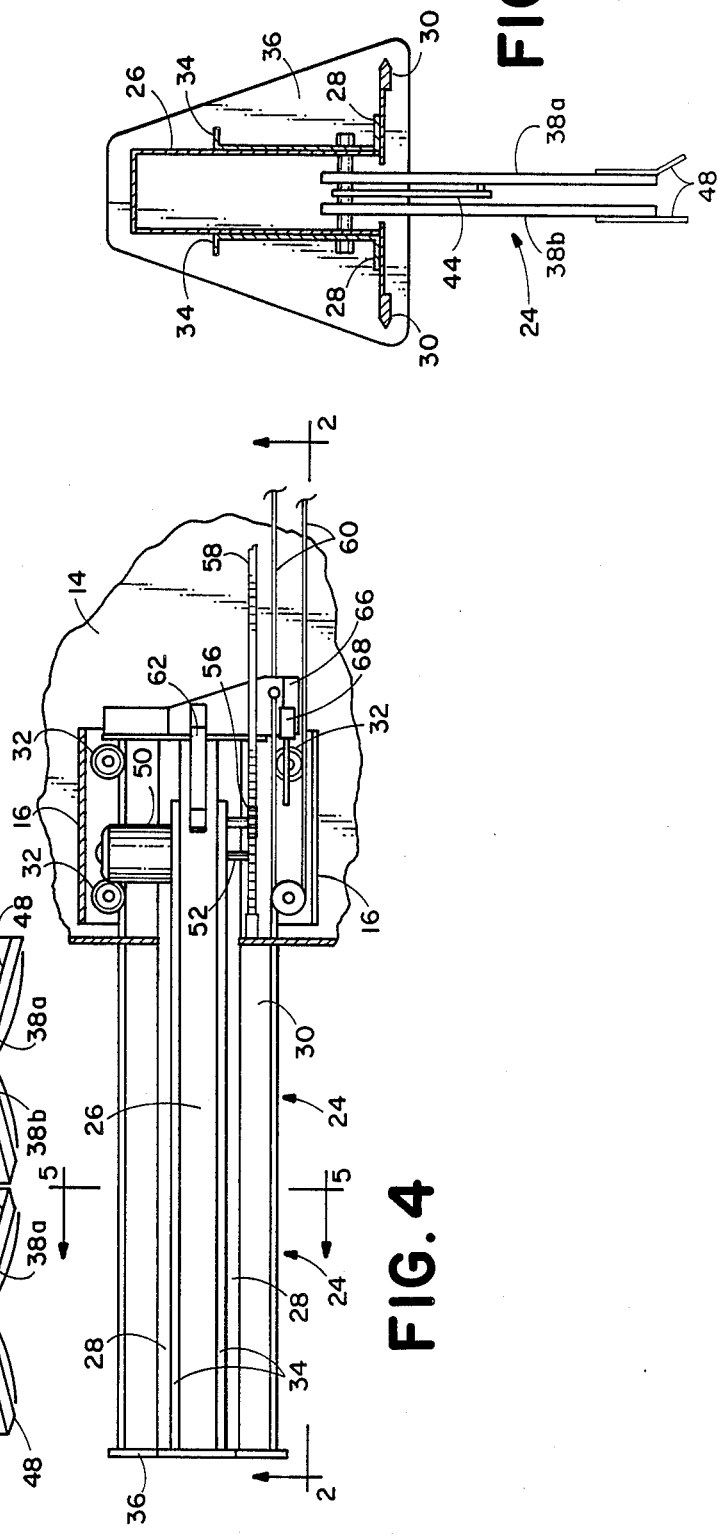
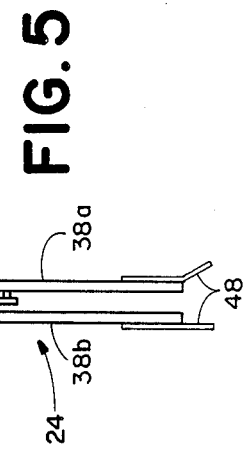

SPEEDBRAKE

BACKGROUND AND SUMMARY OF THE INVENTION

This invention relates to aircraft speedbrakes, and in particular to speedbrakes which are stored in some portion of the aircraft other than its wing and which do not affect the aerodynamics of the wing when deployed.

With general aviation aircraft it is difficult to descend rapidly without either shock cooling the engines, overspeeding the airframe or both. This is because this class of aircraft is not designed for rapid descent and achieving it requires operating the aircraft outside of its normal operating envelope. One way to achieve a high descent rate in general aviation aircraft is to reduce the power level until it is at or near idle. However, the engines used in this type of aircraft are air cooled and are designed to maintain design operating temperature at altitude when operating at cruise power. Thus, at lower power settings the engines do not produce enough energy to keep them warm. Another way to achieve rapid descent is to maintain cruise, or near cruise, power, thereby preventing shock cooling, but fly at a negative angle of attack. Doing so increases the speed of the aircraft, however, and its speed will exceed design limits before high descent rates are achieved.

While speedbrakes have commonly been used to reduce the speed of an aircraft, and thus increase its rate of descent, without having to reduce power or angle of attack, the speedbrakes of the prior art have had inherent difficulties which have limited their acceptance on general aviation aircraft. Heretofore, speedbrakes have been part of the wing or have been associated with the wing. As a result they affect the aerodynamic characteristics of the wing when deployed. Typically, wing-mounted speedbrakes alter the pitch of the aircraft whenever they are extended or retracted, thereby requiring the pilot to retrim the aircraft. Many general aviation pilots find this objectionable, and, for novice pilots, it can be dangerous. This is particularly true when a landing is being made with the speedbrakes extended and it is necessary to abort the landing close to the ground.

In addition, wing-mounted speedbrakes are difficult to retrofit into existing aircraft. This is because the wings typically contain the fuel tanks and are difficult to obtain access to for locating the actuation mechanism and control cables. Because the necessity for having speedbrakes in general aviation aircraft has recently become acute, due to increased airport utilization which requires rapid descent from high altitude during landing, the ability to retrofit it on existing aircraft has become an important aspect of any speedbrake system.

Finally, the prior art wing-mounted speedbrakes are deployed against the airstream and thus transmit the aerodynamic loads generated on them through their actuation system. As a result, the actuation system must be large and quite heavy and must have enough power to overcome the aerodynamic loads. In addition, the mounting structure for the actuators must be heavy in order to transmit this concentrated load to the aircraft structure.

The present invention overcomes the foregoing shortcomings and limitations of prior art speedbrakes by installing them in the engine nacelles, behind the trailing edge of the wing and by making them translate laterally between their extended and retracted positions.

Each speedbrake is carried by a support frame which allows it to be installed as a unit into the nacelle. In the preferred embodiment, the speedbrake is installed into the baggage compartment which further eases its installation as a retrofit in an existing aircraft. A flap, slidably mounted in the frame, translates between a retracted position in the nacelle and an extended position outboard of the nacelle and aft of the trailing edge of the wing. The flap comprises a U-shaped housing which has elongate track sections extending outwardly from its lower extremities. The track sections have V-shaped edges which are engaged in V-shaped grooves in spaced-apart sets of rollers which are mounted on the support frame. Thus, the track and rollers form a slide mechanism which permits the housing to translate freely into and out of the nacelle. This slide mechanism then transmits all of the aerodynamic load of the flap to the aircraft structure so that none of this load is imparted to the flap actuation system. Thus, the load is spread over a large contact area and hard points are not required to receive concentrated loads through the actuator as is the case with the prior art speedbrakes.

Located in the housing are four plates which are mounted on pivots that allow them to be rotated up into the housing or extend down from it. The plates are arranged in two pairs with each pair including a plate which rotates outwardly and a plate which rotates inwardly, with the plates in each pair being interconnected by a lever which causes them to rotate in unison. A low-friction striker plate is mounted in the nacelle at a location where it will contact the outwardly rotating plates as the housing is retracted into the nacelle and rotate them up into the housing. Thus, the plates are withdrawn into the housing automatically as the flap is retracted and are extended from the housing automatically as the flap is extended.

The flap located in one of the two engine nacelles has a motor which moves it between its extended and retracted positions and the flap located in the other engine nacelle is connected to the motor-driven flap by a cable system. The motor is actuated by a switch located in the cockpit. The switch permits the flaps to be extended in any incremental amount desired, but causes them to be fully retracted when any retraction is initiated. Because the aerodynamic load generated on the flap is transmitted to the aircraft through the track and rollers, the motor and cable system can be quite lightweight. In addition, the motor can be relatively low powered. Thus, these components can be relatively lightweight and inexpensive.

Since the flaps are located behind the trailing edge of the wing they do not affect the aerodynamic performance of the wing. By translating between their extended and retracted position, rather than rotating as is the case with prior art flaps, it is possible to position the flaps in the desired location and to arrange them so that their vertical extent is greater when they are extended than when retracted.

Accordingly, it is a principal object of the present invention to provide speedbrakes which do not influence the aerodynamic performance of the wing when they are extended.

It is a further object of the present invention to provide such speedbrakes which deflect thrust as well as increase drag.

It is a further object of the present invention to provide speedbrakes which have greater vertical extent when extended than when retracted.

It is a still further object of the present invention to provide speedbrakes which are extended and retracted by being translated parallel to their planar face.

It is a yet further object of the present invention to provide speedbrakes which are not stored in the wing of the aircraft.

The foregoing and other objectives, features and advantages of the present invention will be more readily understood upon consideration of the following detailed description of the inventi speedbrake when deployed, with the nacelle in which it is placed being shown in section.

FIG. 3 is a fragmentary sectional view taken along the line 3—3 in FIG. 2.

FIG. 4 is a fragmentary sectional view taken along the line 4—4 in FIG. 2.

FIG. 5 is a sectional view taken along the line 5—5 in FIG. 4.

DETAILED DESCRIPTION OF THE INVENTION

Referring to FIG. 1 of the drawings, one of the speedbrakes of the present invention is shown installed in the aft portion of one of the engine nacelles 10 of a twin engine aircraft, such as a CESSNA 421. While engine nacelles are the preferred location on aircraft having wing-mounted engine nacelles which extend beyond the trailing edge of the wing, the speedbrakes can be placed in alternate locations in different types of aircraft. The speedbrakes must be contained completely within an aerodynamically faired portion of the aircraft, which permits them to be laterally deployed to a position where they do not affect wing aerodynamics. They also preferably should be located in a position where they will be located in the thrust disk of the aircraft propulsion system. In aircraft having engine nacelles which do not extend behind the wing this can be accomplished by providing extension pods for the nacelles. In single-engine aircraft it may be necessary to install the speedbrakes in the fuselage or in specially designed appendages to it.

Referring to FIG. 3, each speedbrake includes a frame 12 which attaches to the skin 14 of its associated engine nacelle thereby permitting it to easily be retrofit into the baggage compartment of the engine nacelle of an existing aircraft. The frame includes an elongate L-shaped support plate 16 having an ear 18 at its upper extremity which is attached to the skin 14 by means such as rivits 20. The bottom leg of the plate 16 is attached to a pair of channels 22 which also are attached to the skin 14 by means such as rivets 20 and which give the rigidity to the system necessary to allow it to be retracted and extended.

The operative element of the speedbrake is a flap 24 which is slidable within the frame 12 between a retracted position, where it is enclosed inside of the engine nacelle, and an extended position, where it is located outside of the engine nacelle. The flap comprises a U-shaped housing 26, which has forward and rearward facing protrusions 28 at its lower extremity. Attached to the protrusions 28 are elongate track sections 30 having v-shaped edges which fit into mating grooves in spaced-apart sets of rollers 32 that are mounted on the channels 22. Thus, the housing 26 will freely slide out of and into the frame 12. Furthermore, since the rollers in each set are separated from one another, all of the aerodynamic load generated on the flap is transmitted through the rollers 32 to the frame. Thus, frame 12 spreads the load to the structural elements of the aircraft over a large area, thereby eliminating the requirement of structural hard points which are required in prior art speedbrakes.

Located medially along both sides of the housing 26 are ledges 34 which extend outwardly at right angles from the sides. The forward facing ledge 34 acts as a dam and the rearward facing ledge creates turbulence. Thus, they both increase the effectiveness of the speedbrakes. Attached to the end of the housing 26 is a fairing 36 which is contoured to cover the opening in the nacelle skin through which the flap extends.

Rotatably mounted within the housing 26 are four hinged plates 38 which move between stowed positions, where they are enclosed in the housing, and deployed positions, where they extend below the housing. There are two sets of the plates each comprising an outwardly rotating plate 38a and an inwardly rotating plate 38b, with the outwardly rotating plates being offset forwardly and inwardly of the mating inwardly rotating plates. The outwardly rotating plates rotate about pivots 40a located at their upper inner corners, and the inwardly rotating plates rotate about pivots 40b located at their upper outer corners. A linkage bar 44, which interconnects the two plates in each set, causes the inwardly rotating plates 38b to rotate inwardly into the housing 26 as the corresponding outwardly rotating plates rotate outwardly into it. A low friction striker plate 42 is mounted on the channels 22 to hold the plates 38 in their stowed positions when the flap is in its retracted position. As the flap is extended each set of the plates drops to its deployed position as it emerges from the nacelle and reaches the end of the striker plate. Conversely, as the housing is retracted into the nacelle the outwardly rotating plates 38a contact the striker plate and are rotated into the housing. Thus, the plates rotate into the housing automatically as the flap is retracted into the nacelle and rotate out of the housing automatically as the flap is extended.

The plates 38 have holes 46 located in them to prevent buffeting when they are deployed. The lower edges of the plates are angled in order to permit the corner of each plate to miss the pivot of its paired plate and still have the maximum possible length. Tabs 48, located at the lower edges of the plates, are shaped to aerodynamically assist deployment of the plates.

One of the flaps 24 is moved between its extended and retracted positions by means of a motor 50, which is attached to one side of the housing 26 near its inner end. The motor has a shaft 52 which extends through the housing and carries a sprocket 54 on its extremity. A freely-rotating idler sprocket 56 is mounted on the housing beside the sprocket 54. A length of chain 58, which is attached at both of its ends to the nacelle, passes between the sprockets 54 and 56 and is engaged by them. The chain 58 extends across that portion of the nacelle which the flap traverses as it is moved between its extended and retracted positions. Thus, as the sprocket moves along the chain when the motor is driven it moves the flap between its extended and retracted positions.

The other flap is moved between its extended and retracted positions by means of a cable system 60 which interconnects the two flaps. The portions of the cables which lie outside of the aircraft are located behind the trailing edge of the wing and are covered by an aerodynamically smooth fairing. The cables pass through the body of the aircraft in conduits which are sealed by standard methods in order to maintain cabin pressure.

Since the aerodynamic load is carried by the track 30 and rollers 32 rather than being transmitted to the actuation system the motor 50, sprockets 54 and 56, and chain 58 can be relatively lightweight. In addition, since the motor is not required to deploy the flaps against the aerodynamic loads it can be relatively low powered. Accordingly, all of these elements can be lightweight and relatively inexpensive.

A finger 62, located on the inside edge of the housing 26, engages a microswitch 64, mounted on the side of the nacelle, when the flap is fully retracted. When engaged the switch 64 causes operation of the motor to be discontinued. Similarly, a ramp 66, attached to the inside edge of the housing 26, engages a microswitch 68, mounted on the skin 14, when the flap is fully extended. The microswitch 68 also causes operation of the motor to be discontinued when it is disengaged.

The motor is activated by a switch (not shown) located in the cockpit of the aircraft. For safety reasons, the switch permits stopping the flaps at any point during their extension, but is spring loaded to cause full retraction once initiated. A light (not shown), located in the instrument panel, is illuminated when the flaps are extended.

Since the flaps are located behind the trailing edge of the wing they have substantially no affect on its aerodynamics. Therefore, extending and retracting the flaps does not change the pitch or affect the control of the aircraft in any way other than altering its speed. As a result, it is safe to use the speedbrakes of the present invention at any time regardless of the speed or altitude of the aircraft. Furthermore, since the flaps are located at the rear of the engine nacelles, they are located in the thrust disk of the propulsion system so that they deflect a portion of the thrust as well as create drag. Finally, since the flaps are deployed from the outboard side of the nacelles the downwash created by them does not affect the control surfaces on the tail of the aircraft.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A speedbrake for a fixed-wing aircraft comprising:
   (a) a flap having planar surface means for appreciably reducing the speed of the aircraft when said flap is deployed in an extended position generally normal to the airstream when said aircraft is in flight, said flap comprising a housing portion and hinged plates;
   (b) means for storing said flap in a retracted position inside of a faired portion of the aircraft other than its wing; and
   (c) means for moving said flap between said retracted and extended positions, said means for moving comprising track means for translating said flap parallel to said planar surface; where said housing portion moves along said track means, and said hinged plates fit within said housing portion when said flap is in its retracted position and protrude from said housing portion when said flap is in its extended position.

2. The speedbrake of claim 1, further comprising a linkage bar linking two of said hinged plates to one another in a manner such that both of said two hinged plates move together.

3. The speedbrake of claim 1, wherein said surface means has approximately twice the frontal surface area when said hinged plates protrude from said housing portion as when said hinged plates are within said housing portion.

4. The speedbrake of claim 1 including means for positioning said plates in said housing portion automatically as said flap is moved to its retracted position and for removing said plates from said housing portion automatically as said flap is moved to its extended position.

5. The speedbrake of claim 1 wherein said track means comprises two pairs of rollers which are spaced apart from one another and have grooved faces which contact opposite side edges of said housing portion.

6. The speedbrake of claim 1 wherein said means for moving comprises a chain which extends across said faired surface, a freely-rotating idler sprocket which is mounted on said housing and remains in contact with said chain when said flap is moved between its retracted and extended positions.

7. The speedbrake of claim 6 wherein said means for moving further comprises a motor having a sprocket which is rotatably driven thereby and is arranged to engage said chain.

8. A speedbrake assembly for installation in an aircraft comprising:
   (a) a frame;
   (b) a track which is attached to said frame;
   (c) a flap having a planar surface;
   (d) means independent of the aircraft for translating said flap parallel to said planar surface between a retracted position wherein said flap is substantially adjacent to said frame and an extended position wherein said flap is substantially separated from said frame; and
   (e) means for mounting said frame, track and flap as a unit into a faired surface of the aircraft in a manner such that said flap is enclosed within said faired surface when said flap is in said retracted position and projects from said faired surface when said flap is in said extended position.

* * * * *

UNITED STATES PATENT AND TRADEMARK OFFICE
CERTIFICATE OF CORRECTION

PATENT NO. : 4,783,024

DATED : November 8, 1988

INVENTOR(S) : Michael A. McDaniel

It is certified that error appears in the above-identified patent and that said Letters Patent is hereby corrected as shown below:

Col. 3, line 13  After "description of the" delete --inventi--

Col. 3, line 13  Before "speedbrake" insert --invention taken in conjunction with the accompanying drawings.

Brief Description of the Drawings

FIG. 2 is a side elevation view of the--

Figure 1:
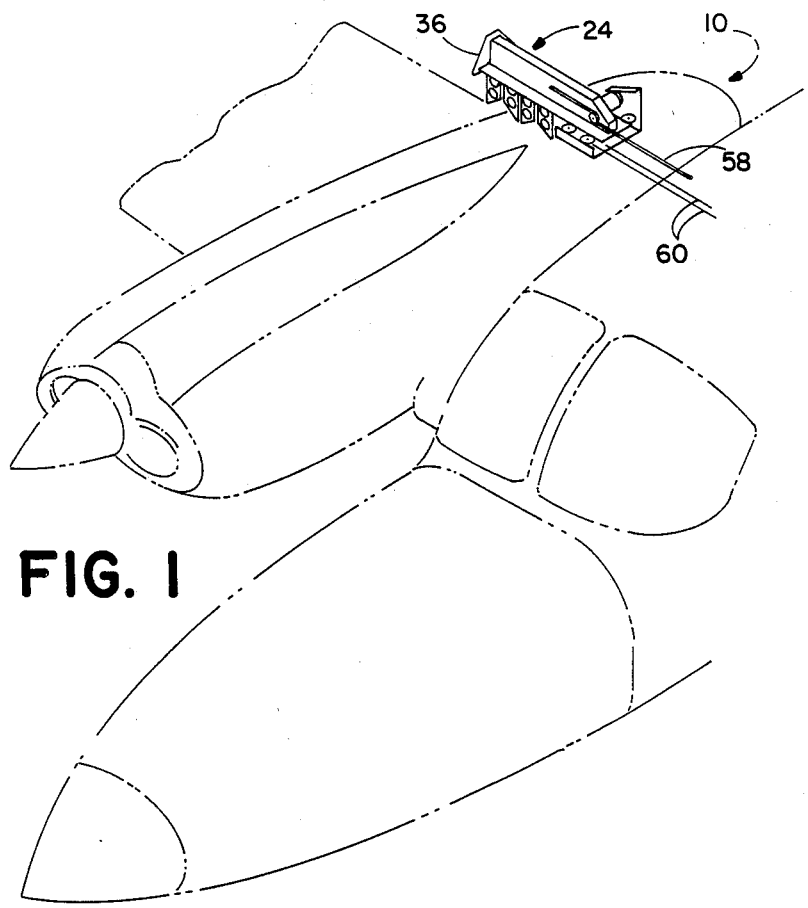
FIG. 1 is a pictorial view of a portion of an aircraft, shown in phantom, illustrating the location of one of the speedbrakes of the present invention in one of the aircraft's nacelles.
Figure 3:
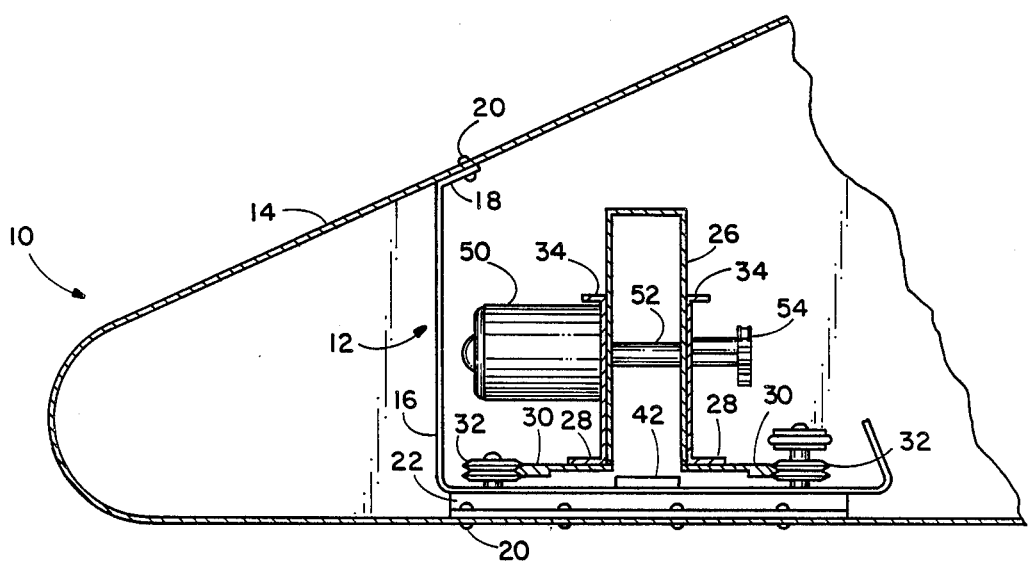

Col. 3, line 65  Change "v-shaped" to --V-shaped--

Signed and Sealed this

Tenth Day of April, 1990

Attest:

HARRY F. MANBECK, JR.

Attesting Officer  Commissioner of Patents and Trademarks